United States Patent [19]

Matsuura et al.

[11] Patent Number: 4,822,763
[45] Date of Patent: Apr. 18, 1989

[54] CATALYST COMPONENT FOR POLYMERIZATION OF OLEFIN

[75] Inventors: Mitsuyuki Matsuura; Takashi Fujita, both of Yokkaichi, Japan

[73] Assignee: Mitsubishi Petrochemical Company Limited, Tokyo, Japan

[21] Appl. No.: 63,443

[22] Filed: Jun. 18, 1987

[30] Foreign Application Priority Data

Jun. 18, 1986 [JP] Japan .................................. 61-142311

[51] Int. Cl.$^4$ .................................................. C08F 4/64
[52] U.S. Cl. ........................................ 502/113; 502/115; 502/116; 502/119; 502/121; 502/125; 502/126; 502/127; 502/108; 526/116; 526/125
[58] Field of Search ............... 502/113, 119, 121, 125, 502/126, 127, 108, 115, 116

[56] References Cited

U.S. PATENT DOCUMENTS

| | | | |
|---|---|---|---|
| 4,492,768 | 1/1985 | Hawley | 502/125 X |
| 4,518,751 | 5/1985 | Mizogami et al. | 502/113 X |
| 4,537,870 | 8/1985 | Hawley | 502/119 X |
| 4,588,703 | 5/1986 | Cowan et al. | 502/119 X |
| 4,618,595 | 10/1986 | Dietz | 502/108 |

Primary Examiner—Patrick P. Garvin
Attorney, Agent, or Firm—Oblon, Fisher, Spivak, McClelland & Maier

[57] ABSTRACT

A catalyst component for polymerization of olefin, comprising a contact product of a component (A) which is a solid component containing titanium having at least one $OR^1$ group (where $R^1$ represents a hydrocarbon residue) and magnesium and a halogen as the essential components; a component (B) which is an acid halide compound; a component (C) which is a compound having an $OR^2$ group (where $R^2$ represents a hydrocarbon residue or hydrogen atom); and a component (D) which is a halide compound of silicon. When an olefin is polymerized by use of this as the transition metal component of a Ziegler type catalyst, an olefin polymer with high activity and high I.I and excellent polymer properties can be obtained.

31 Claims, No Drawings

4,822,763

CATALYST COMPONENT FOR POLYMERIZATION OF OLEFIN

BACKGROUND OF THE INVENTION

1. Field of the Art

This invention relates to a catalyst component for polymerization of olefins. More particularly, the present invention relates to a solid catalyst component containing a transition metal of the Ziegler type catalyst.

When polymerization of an olefin is performed by the use of the solid catalyst component of the present invention as the transition metal component of a Ziegler catalyst, a polymer having high activity, excellent stereoregularity and good polymer properties in bulk density, particle shape, particle size, particle distribution and the like can be produced.

It has been known in the art that a highly active catalyst can be obtained by the use of a magnesium compound such as a magnesium halide, a magnesium oxyhalide, a dialkylmagnesium, an alkylmagnesium halide, a magnesium alkoxide, or a complex of a dialkylmagnesium with an organoaluminum, etc., as the carrier for a transition metal compound such as titanium compound, and a number of relative inventions have been proposed.

In these prior art techniques, the catalyst activity is high to some extent, but the polymer properties of the polymer produced are not entirely satisfactory and improvements thereof have been desired. The polymer properties are extremely important in polymerization processes such as slurry polymerization and gas phase polymerization. If the polymer properties are poor, polymer adhesion within the polymerization vessel or difficulty in polymer withdrawal from the polymerization vessel, etc., may be caused.

Also, the polymer concentration within a polymerization vessel is intimately related with the polymer properties and cannot be made high unless the polymer properties are good. It is very disadvantageous in industrial production when the polymer concentration within a polymerization vessel cannot be made high.

Also, in preparation of a large number of catalyst components of the prior art, the transition metal component is used in a large amount. This is very inconvenient for the preparation of the catalyst. It is necessary to remove much of the transition metal component not contained as the catalyst component from the catalyst component, and for that purpose much solvent, etc., are required, which leads to increase in production cost of the catalyst.

Also, it is necessary to subject the transition metal components which have become unnecessary to decomposition treatment, whereby generation of halogen gas, a hydrogen halide, etc., occurs in most cases and is deleterious for environmental hygiene. Accordingly, improvement in the quantity of transition metal component has been desired.

2. Prior Art

Ziegler-type catalysts have been well known in the art as catalysts for stereoregular polymerization of olefins, and various methods have been proposed for further improvement of their activity and stereoregularity, as is also well known in the art.

Examples of these various improvement methods are those as proposed in Japanese Patent Publication No. 359/1985. In these known techniques, polymers of high activity and good stereoregularity are described as being obtainable, but further improvement and enhancement of stereoregularity, polymer properties of the polymer formed (bulk density, etc.) and the catalyst active level (the so-called "post-treatment" during production polymer cannot be completely omitted), etc., have been still desired under the present circumstances.

SUMMARY OF THE INVENTION

An object of the present invention is to provide a solution to the above described problems by providing a catalyst component comprising the components (A) to (D) shown below.

More specifically, the present invention provides a catalyst component for polymerization of olefin, comprising a contact product of the following components (A), (B), (C) and (D):

component (A): solid component containing titanium having at least one $OR^1$ group (wherein $R^1$ represents a hydrocarbyl group) and magnesium and a halogen as the essential components;

component (B): an acyl halide compound;

component (C): a compound having an $OR^2$ group (where $R^2$ represents a hydrocarbyl group or hydrogen atom); and component (D): a silicon halide compound.

When polymerization of an olefin is performed by use of the solid catalyst component of the present invention as a transition metal component of Ziegler catalyst, a polymer having high activity, excellent stereoregularity and also excellent polymer properties in bulk density, particle shape, particle size, particle distribution and the like can be obtained.

Also, surprisingly, a polymer with higher stereoregularity can be obtained than when employing a titanium halide compound such as titanium tetrachloride which is used in most cases when preparing a high activity catalyst to be used particularly for polymerization of propylene, etc. The reason why such polymer with high stereoregularity can be obtained is not clear. High stereoregularity of polymer is important for making broader the uses of the polymer.

The solid catalyst component of the present invention can be preferably prepared by use of a specific silicon compound (component (E)) in addition to the above components (A), (B), (C) and (D). In this case the activity of the catalyst and the stereoregularity of the polymer obtained can be further improved, and the polymer properties obtained are also good. When the component (E) is used, an electron donor (external donor) may be also used in combination during polymerization, but a polymer with excellent activity, high stereoregularity and excellent polymer properties as described above can be obtained without use of an electron donor during polymerization.

Further, when the component (E) is used, the activity persistency of the catalyst is improved to a great extent, whereby prolonged operation, particularly operation during multi-stage polymerization becomes easier in the latter half without lowering in catalyst activity, and operation at increased polymerization temperature is possible due to absence of lowering in catalyst activity to produce excellent effects such that productivity can be improved to a great extent.

Since the catalyst component in accordance with the present invention does not require the use of a titanium halide compound, no additional processing will be required for removing the excess titanium halide compound as required in production of the conventional catalyst component/catalyst whereby substantial reduction in production cost of catalyst components/catalysts is advantageously realized.

DETAILED DESCRIPTION OF THE INVENTION

The catalyst component for olefin polymerization of the present invention is prepared by contact of the following components (A), (B), (C) and (D).

COMPONENT (A)

The component (A) used in the present invention is a solid containing titanium having at least one $OR^1$ group (where $R^1$ represents a hydrocarbyl group) and magnesium and a halogen as the essential components. The essential components contained in the component (A) may be derived either from independent starting materials, respectively, or from the starting material in which these are respectively combined. Particularly, the titanium compound having at least one $OR^1$ group is rather the state of the titanium compound when the component (A) is prepared, and it is not clear whether it exists under such a state in the component (A).

As the titanium component source having at least one $OR^1$ group contained in the component, compounds represented by the formula $Ti(OR^1)_{4-n}X_n$ (where $R^1$ is a hydrocarbyl group, preferably having about 1 to 10 carbon atoms, more preferably about 2 to 8, X represents a halogen, and n represents a number of $0 \leq n \leq 3$).

Specific examples may include $Ti(OC_2H_5)_4$, $Ti(OiC_3H_7)_4$, $Ti(O-nC_4H_9)_4$, $Ti(O-nC_6H_{13})_4$, $Ti(O-nC_3H_7)_4$, $Ti(O-iC_4H_9)_4$, $Ti(O-nC_8H_{17})_4$, $Ti[OCH_2CH(C_2H_5)C_4H_9]_4$, $Ti(OC_2H_5)_3Cl$, $Ti(OC_2H_5)_2Cl_2$, $Ti(O-nC_4H_9)Cl$, $Ti(O-nC_4H_9)_2Cl_2$, $Ti(OC_2H_5)_3Br$, $Ti(OC_6H_{13})Cl_3$, $Ti(O-nC_8H_{17})_2Cl_2$ and the like.

Also, condensation products of these titanium compounds may be used. For example, compounds represented by the formula:

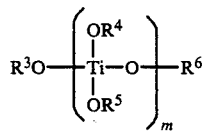

(where $R^2$ to $R^6$ are hydrocarbyl group, which may be the same or different, having about 1 to 10 carbon atoms, preferably about 2 to 8, and m shows a number from 2 to about 10) may be included.

Specific examples are respective polymers of isopropoxide with m=2, m=4, and m=10, respective polymers of n-butoxide with m=2, m=4, m=7 and m=10.

Among these titanium compounds, $Ti(OC_2H_5)Cl_3$, $Ti(O-nC_4H_9)Cl_3$, $Ti(OC_2H_5)_4$ and $Ti(O-nC_4H_9)_4$ are preferred, $Ti(O-nC_4H_9)_4$ being more preferable.

As the magnesium component source, ordinarily a magnesium compound is used. Examples of the magnesium compound are magnesium halides, dialkoxymagnesiums, alkoxymagnesium halides, magnesium oxyhalides, dialkylmagnesiums, magnesium oxide, magnesium hydroxide, and carboxylic acid salts of magnesium. As the halogen of the halide, chlorine is preferred, and the alkyl or alkoxy group is preferably about $C_1$ to $C_{10}$ and the carboxylic acid contains preferably 2 to 20 carbon atoms.

Among them, a magnesium halide is preferred, particularly magnesium dichloride.

On the other hand, as the halogen component source, the halogen contained in the titanium compound used as the titanium component source having at least one $OR^1$ group and/or the magnesium compound used as the above magnesium components source is ordinarily used. Otherwise, as the halogen component source, compounds such as $AlCl_3$, $AlBr_3$, $Al(C_2H_5)Cl_2$, $SiCl_4$, $(CH_3)SiCl_3$, $HSiCl_3$, $FeCl_3$, $PCl_5$, $PCl_3$, $BCl_3$, $HCl$, and $Cl_2$ are also examples.

In the component (A) of the present invention, other components in addition to the above essential components such as silicon, aluminum and boron can also be used, and they can also remain in the component (A). Specific examples of the method for preparation of the component (A) are:

(a) a method in which a magnesium halide is contacted with a titanium compound containing $OR^1$ group;

(b) a method in which an alkoxymagnesium is contacted with a titanium compound containing $OR^1$ group;

(c) a method in which a magnesium halide is contacted with a titanium tetraalkoxide and a polymeric silicon compound of a formula

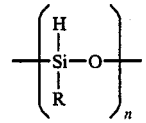

where R is a hydrocarbyl group of 1~10 carbon atoms, preferably a lower alkyl group, and n is a degree of polymerization so that the viscosity of the polymer is from 1~100 centistokes;

(d) a method in which a magnesium compound is dissolved with a titanium tetraalkoxide and an electron donor and precipitated with a precipitating agent; and (e) a method in which an organomagnesium compound such as Grignard reagent, etc., is allowed to react with a halogenating agent, a reducing agent, etc., and then contacted with a titanium compound containing $OR^1$ group. Among the methods (a) to (e), the method (c) is more preferred.

The proportions of the respective components constituting the component (A) may be as desired, as long as the effect of the present invention can be obtained, but are generally preferred within the following range. The proportion of the titanium component having $OR^1$ group may be within the range from $1 \times 10^{-3}$ to 100 based on the magnesium component in terms of molar ratio, preferably within the range from 0.1 to 10. Similarly the proportion of the halogen component may be within the range from 0.1 to 1,000, preferably from 1 to 100 in molar ratio ralative to the magnesium component.

COMPONENT (B)

The component (B) is an acyl halide compound, which is represented by the formula $R^7(COX)_n$ (where $R^7$ is an aliphatic or aromatic hydrocarbon having about 1 to 20 carbon atoms, X is a halogen and n is a number of $1 \leq n \leq 3$).

Specific examples are: $CH_3COCl$, $CH_3CH_2COCl$, $n-C_4H_9COCl$, $i-C_4H_9COCl$, $n-C_6H_{11}CoCl$, CH₃COBr, CH₃(CH₂)₁₆COCl, C₆H₅COCl, C₆H₅CH₂COCl, C₆H₅COBr, (CH₃)C₆H₄COCl,

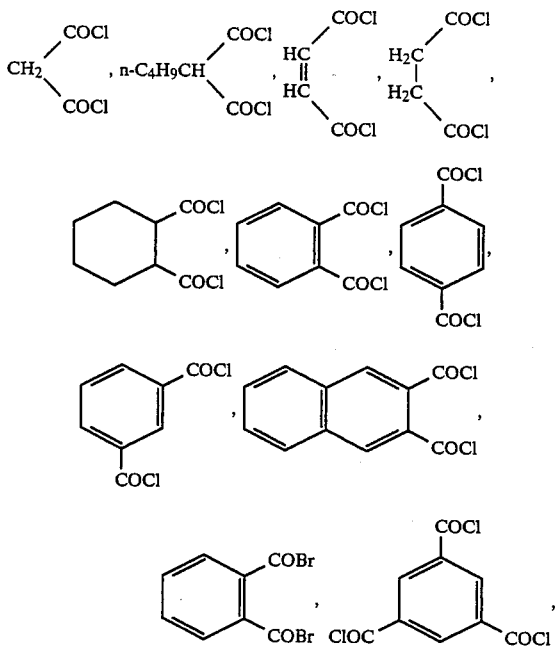

and the like. Among them,

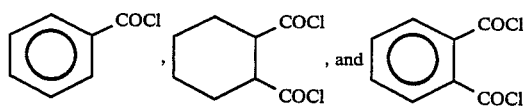

are preferred and

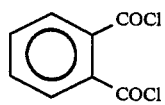

is more preferred.

COMPONENT (C)

The component (C) is a compound having OR² group. Here, R² is a hydrocarbyl group or hydrogen atom, preferably a hydrocarbyl group having 1 to about 10 carbon atoms or a hydrogen atom. As examples of such a compound, are alcohols, esters, ethers and compounds represented by the formula $M(OR^8)_m Y_n$ (where $R^8$ is a hydrocarbyl group having about 1 to about 20 carbon atoms, Y is a halogen or a hydrocarbyl group having 1 to about 20 carbon atoms, M is a metal atom, B, Si, C or P, m and n are $1 \leq m+n \leq 4$, and $1 \leq m \leq 4$, $0 \leq n < 4$).

More specifically, examples of alcohols may include alcohols having 1 to 18 carbon atoms such as methanol, ethanol, propanol, pentanol, hexanol, butanol, octanol, dodecanol, octadecyl alcohol, benzyl alcohol, phenylethyl alcohol, cumyl alcohol, isopropylbenzyl alcohol and the like; and phenols having 6 to 25 carbon atoms which may have alkyl group such as phenol, cresol, xylenol, ethylphenol, propylphenol, cumylphenol, nonylphenol, and naphthol. Among them, a lower alkanol, such as methanol, ethanol, etc., are preferred.

Examples of esters may include methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl benzoate, methyl anisate, ethyl anisate, ethyl ethoxybenzoate, diethyl phthalate, dibutyl phthalate, diheptyl phthalate, γ-butyrolactone, α-valerolactone, coumarine, and ethylene carbonate. Among them, a lower alkyl acetate such as methyl acetate, ethyl acetate, etc., are preferred.

Examples of ethers are preferably those having a total number of carbon atoms of 2 to 20 and may include dimethyl ether, diethyl ether, methylethyl ether, diisopropyl ether, dibutyl ether, diamyl ether, tetrahydrofuran, and diphenyl ether.

Specific examples of the compounds represented by the formula $M(OR^8)_m Y_n$ may include Na(OCH₃), Mg(OC₂H₅)₂, Mg(OC₂H₅)Cl, Ca(OCH₃)₂, Ti(OC₂H₅)₄, Ti(OC₃H₇)₄, Ti(O—nC₄H₉)₄, Ti(O—iC₄H₉)₄, Ti(OC₆H₅)₄, Ti(OC₂H₅)Cl₂, Ti(O—nC₄H₉)Cl₃, Ti(O—nC₄H₉)Cl₂, Zr(O—nC₄H₉)₄, V(OC₂H₅)₂Cl, Fe(OC₂H₅)Cl₂, Zr(OC₂H₅)₂Cl₂, Zn(OC₂H₅)₂, B(OCH₃)₃, B(OC₂H₅)₃, B(OC₂H₅)₂Cl, B(OnC₄H₉)₃, (C₂H₅)B(OCH₃)₂, B(OC₆H₅)₃, Al(OCH₃)₃, Al(OC₂H₅)₃, Al(OC₃H₇)₃, Al(OC₂H₅)₂Cl, Al(OCH₃)Cl₂, (C₆H₅)(CH₃)C(OCH₃)₂, (CH₃)C(OC₂H₅)₃, Si(OCH₃)₄, Si(OC₂H₅)₄, Si(OC₄H₉)₄, (CH₃)Si(OCH₃)₃, (n—C₁₀H₂₁)Si(OC₂H₅)₃, (C₆H₅)Si(OC₂H₅)₃, (C₆H₅)(CH₃)Si(OCH₃)₂, (C₆H₅)₂Si(OCH₃)₂, Si(OC₆H₅)₄, Si(OC₂H₅)₂Cl₂, P(OCH₃)₃, P(OC₂H₅)₃, P(OC₈H₁₇)₃, P(OC₁₈H₃₅)₃, P(OC₂H₅)Cl, and P(OC₆H₅)Cl₂.

Among them, lower alkoxides of boron, silicon, aluminum or phosphorus such as B(OCH₃)₃, B(OC₂H₅)₃, Si(OC₂H₅)₄, Si(OCH₃)₄, Al(OC₂H₅)₃ and P(OC₂H₅)₃ are preferred.

Lower alkanols and lower alkoxides of boron are more preferred.

In addition to those mentioned above, a compound containing an OR group having oxygen may be also used. For example, vanadyl lower alkoxides and phosphoryl lower alkoxides or lower alkoxyhalides such as VO(OCH₃)₃, PO(OC₂H₅)₃ and PO(OCH₃)₂Cl may be employed.

COMPONENT (D)

The component (D) is a silicon halide compound and, preferably, represented by the formula $R^9_p SiX_{4-q}$ (where $R^9$ represents hydrogen or a hydrocarbon residue or a halohydrocarbon residue having 1 to about 20 carbon atoms, X is a halogen and p and q are respectively numbers of $0 \leq p < 4$, $0 < q \leq 4$). Specific examples of such compounds are: SiCl₄, HSiCl₃, ClCH₂SiCl₃, CH₃SiCl₃, (CH₃)HSiCl₂, CH₂=CHSiCl₃, SiBr₄, C₂H₅SiCl₃, (CH₃)₂SiCl₂, (CH₃)₂HSiCl, (n—C₃H₇)SiCl₃, (CH₃)₃SiBr, (CH₃)₃SiCl, (CH₃)(C₂H₅)SiCl₂, (iC₄H₉)SiCl₃, (C₂H₅)₂SiCl₂, (C₆H₅)HSiCl₂, (cyclo—C₆H₁₁)SiCl₃, (C₂H₅)₃SiBr, (C₆C₅CH₂)SiCl₃, CH₃C₆H₄SiCl₃, (C₆H₅)(CH₃)SiCl₂,

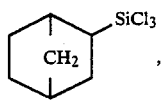

$CH_3(CH_2)_6SiCl_3$, $(C_6H_5)(CH_3)_2SiCl$, $CH_3(CH_2)_8SiCl_3$, $CH_3(CH_2)_9SiCl_3$, $(C_6H_5)SiCl_2$, $(C_6H_5)SiF_2$, $(C_6H_5)SiCl$, $CH_3(CH_2)_{17}SiCl_3$, and $CH_3(CH_2)_{19}SiCl_3$.

Among them, preferable are silicon halides or lower alkyl silicon halides such as $SiCl_4$, $SiBr_4$, $(CH_3)SiCl_3$, $(C_2H_5)_2SiCl_2$, etc. and $SiCl_4$ is more preferred.

CONTACT OF THE COMPONENTS (A)~(D)

The solid catalyst component of the present invention is a contact product of the components (A), (B), (C) and (D) as described above. The contact conditions of these components (A) to (D) can be as desired, as long as the effect of the present invention can be obtained, but generally the following conditions are preferred. The contact temperature is −50° to about 200° C., preferably 0° to 100° C. The contact method may be a mechanical method by means of a rotary ball mill, a vibrating mill, a jet mill, a medium stirring crusher, etc., or a method in which contact is effected by stirring in the presence of an inert diluent. Examples of the inert diluent to be used in this method may include aliphatic or aromatic hydrocarbons and halohydrocarbons and polysiloxanes.

The order of contact is not particularly limited, but the following orders may be considered.

(a) component (A)→component (D)→component (C)→component (B)→component (D)
(b) component (A)→component (D)→component (B)→component (C)→component (D)
(c) component (A)→component (B)→component (D)→component (C)
(d) component (A)→component (D)→component (C)→component (B)
(e) component (A)→component (D)→component (C)→component (B)→component (D)→component (B)

The amounts of the components (A) to (D) may be as desired, as long as the effect of the invention can be realized but generally the following ranges are preferred. The amount of the component (B) used may be within the range of from $1 \times 10^{-3}$ to 10 in terms of molar ratio relative to the magnesium compound constituting the component (A), preferably within the range of from $1 \times 10^{-2}$ to 1.

The amount of the component (C) used may be within the range of from $1 \times 10^{-3}$ to 10 in terms of molar ratio relative to the magnesium compound constituting the component (A), preferably within the range of from $1 \times 10^{-2}$ to 1.

The amount of the component (D) used may be within the range of from $1 \times 10^{-2}$ to 100 in terms of molar ratio relative to the magnesium compound constituting the component (A), preferably within the range of from about 0.1 to 10.

The catalyst component to be used in the present invention can be the solid component obtained as described above which may be used as such, or the solid component can be also used as the product which has undergone preliminary polymerization in which an olefin is contacted with it in the presence of an organometallic compound of the group I to group III of the periodic table.

In the case when the catalyst component is one which has undergone preliminary polymerization, the preliminary polymerization condition of olefins for preparation of this component are not particularly limited, but generally the following conditions are preferred. The polymerization temperature may be 0° to 80° C., preferably 10° to 60° C., and the amount of an olefin polymerized is preferably 0.001 to 50 grams, more preferably 0.1 to 10 grams, of an olefin per 1 gram of the solid component.

As the organometal compound of the group I to group III of the periodic table during preliminary polymerization, those generally known as organometallic compounds for the Ziegler catalysts can be used.

Specific examples are organoaluminum compounds such as $Al(C_2H_5)_3$, $Al(isoC_4H_9)_3$, $Al(C_5H_{13})_3$, $Al(C_8H_{17})_3$, $Al(C_{10}H_{21})_3$, $Al(C_2H_5)_2Cl$, $Al(isoC_4H_9)_2Cl$, $Al(C_2H_5)_2H$, $Al(isoC_4H_9)_2H$, and $Al(C_2H_5)_2(OC_2H_5)$.

As other organometallic compounds of the group I to group III of the periodic table, organozinc compounds such as $Zn(C_2H_5)_2$, $Zn(n-C_4H_9)_2$, $Zn(C_2H_5)Cl$, and $Zn(n-C_6H_{13})_2$, organomagnesium compounds such as $Mg(C_2H_5)(C_4H_9)$, $Mg(n-C_6H_{13})_2$, and $Mg(C_4H_9)Cl$, organolithium compounds such as $Li(C_4H_9)$ and $Li(C_2H_5)$, and also complexes such as $(nC_4H_9)_2Mg \cdot 2(C_2H_5)_3Al$ and $7.5\{(n-C_4H_9)_2Mg\} \cdot (C_2H_5)Al$, can be used.

The amount of the organometallic compound during preliminary polymerization is such that a molar ratio of the metal in the organometallic compound/titanium in the solid catalyst component is 0.1 to 100, preferably 1 to 20. Also, during preliminary polymerization, in addition to these, known electron donors such as an alcohol, an ester, or a ketone can be added.

As the olefins to be used during preliminary polymerization, $C_2 \sim C_6$ olefins such as ethylene, propylene, 1-butene, 1-hexene, 4-methyl-pentene-1, etc., may be employed. It is also possible that hydrogen be present during preliminary polymerization.

COMPONENT (E), AN OPTIONAL COMPONENT

Also, the catalyst component of the present invention can be preferably prepared by contact with a specific silicon compound (component (E)) represented by the following formula $R^{10}R^{11}_{3-n}Si(OR^{12})_n$ (where $R^{10}$ represents a branched hydrocarbyl group, $R^{11}$ represents hydrocarbyl group which is the same as or different from $R^{10}$, $R^{12}$ represents a hydrocarbyl group, and n represents a number of $1 \leq n \leq 3$).

Here, $R^{10}$ preferably has a branch or the carbon atom adjacent to the silicon atom, the branched group in that case is preferably an alkyl group, cycloalkyl group or aryl group (e.g. phenyl group or methyl-substituted phenyl group). More preferably, $R^{10}$ is the carbon atom adjacent to silicon atom, namely, with the carbon atom at the α-position being secondary or tertiary carbon atom.

Above all, the carbon atom bonded to the silicon atom is preferably tertiary. $R^{10}$ may have generally 3 to 20, preferably 4 to 10 carbon atoms. $R^{11}$ is ordinarily a branched or straight chain aliphatic hydrocarbon group having 1 to 20, preferably 1 to 10 carbon atoms. $R^{12}$ is ordinarily an aliphatic hydrocarbon group, preferably a chain aliphatic hydrocarbon group having 1 to 4 carbon atoms.

Specific examples of the silicon compounds are as follows.

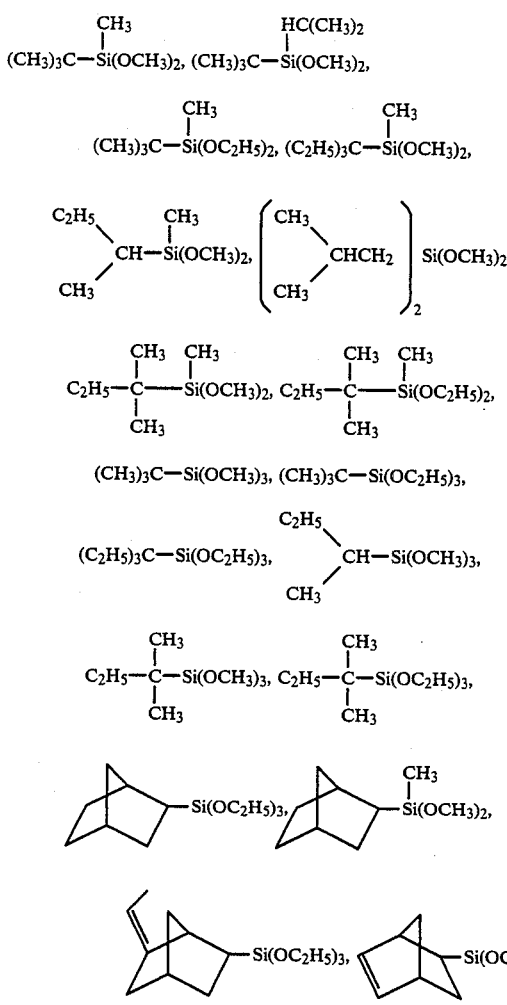

When the silicon compound as described above is used, the contact conditions may be as desired, as long as the effect of the present invention can be realized, but generally the following conditions are preferred. The contact temperature may be −50° to about 200° C., preferably 0° to 100° C. As the contact method, a mechanical method by means of a rotatory ball mill, a vibrating mill, a jet mill, a medium stirring crusher, etc., or a method in which contact is effected by stirring in the presence of an inert diluent may be employed. As the inert diluent to be used in this method, aliphatic or aromatic hydrocarbons or halohydrocarbons, polysiloxane, etc., may be employed.

When the above silicon compound (component (E)) is used, the amount may be within the range of 0.01 to 1,000, preferably 0.1 to 100, in terms of the atomic ratio (Si/Ti) of silicon of the silicon compound to the titanium component constituting the catalyst component.

The order of contact when using the silicon compound as the component (E) is not particularly limited, but, for example, the following orders may be considered.

(a) component (A)→component (D)→component (C)→component (B)→component (D)→component (E)

(b) component (A)→component (D)→component (B)→component (C)→component (D)→component (E)

(c) component (A)→component (D)→component (C)→component (B)→component (D)+component (E)

(d) component (A)→component (D)→component (B)→component (C)→component (E)→component (D)

POLYMERIZATION OF OLEFIN (Formation of catayst)

The catalyst component of the present invention can be used for polymerization of an olefin in combination with an organometal compound which is a co-catalyst. Any of the organometal compounds of the metals of the group I to IV of the periodical table known as the co-catalyst can be used. Particularly, organoaluminum compounds are preferred. Specific examples of organoaluminum compounds are those represented by the formula $R^{13}_{3-n}AlX_n$ or $R^{14}_{3-m}Al(OR^{15})_m$ (where $R^{13}$ and $R^{14}$, which may be the same or different, each represent hydrocarbyl group having 1 to about 20 carbon atoms or hydrogen, $R^{15}$ represents a hydrocarbyl group having 1 to about 20 carbon atoms, X is a halogen, n and m are respectively numbers of $0 \leq n \leq 2$, $0 \leq m \leq 1$). More specifically, (a) trialkylaluminums such as trimethylaluminum, triethylaluminum, triisobutylaluminum, trihexylaluminum, trioctylaluminum, and tridecylaluminum; (b) alkyl aluminum halides such as diethylaluminum monochloride, diisobutylaluminum monochloride, ethylaluminum sesquichloride, and ethylaluminum dichloride; (c) dialkylaluminum hydrides such as diethylaluminum hydride and diisobutylaluminum hydride; (d) alkyl aluminum alkoxides such as diethylaluminum ethoxide, diethylaluminum butoxide, and diethylaluminum phenoxide may be included.

Further, these organoaluminum compounds (a), (b), and (c) can be used with other organometallic compounds such as an alkylaluminum alkoxide represented by $R^{16}_{3-a}Al(OR^{17})_a$ ($1 \leq a \leq 3$, $R^{16}$ and $R^{17}$, which may be the same or different, each represent hydrocarbyl group with 1 to about 20 carbon atoms). For example, it is possible to use a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum and diethylaluminum ethoxide and diethylaluminum chloride. The amount of these organometallic compounds used is not particularly limited, but it is preferably within the range of from 0.5 to 1,000 in terms of weight ratio relative to the solid catalyst component of the present invention.

For improvement of stereoregularity of an olefin polymer with 3 or more carbon atoms, it is effective to add and permit a known electron donating compound such as ether, ester, amine, silane compounds to co-exist during polymerization. The amount of the electron donating compound to be used for such purpose may be 0.001 to 2 mols, preferably 0.01 to 1 mol per 1 mol, of the organoaluminum compounds.

OLEFIN

The olefin to be polymerized by the catalyst system of the present invention is represented by the formula R—CH=CH₂ (where R represents hydrogen atom or a hydrocarbyl group having 1 to 10 carbon atoms, which may have a branched group). Typical examples may include olefins such as ethylene, propylene, butene-1, pentene-1, hexene-1, 4-methylpentene-1 and the like. Preferably, ethylene and propylene, more preferably, propylene may be employed.

In these cases of polymerization, it is possible to carry out copolymerization of ethylene with up to 50 wt.%, preferably 20 wt.%, of the above olefins, and copolymerization of propylene with up to 30 wt.% of the above olefins, particularly preferably ethylene. It is also possible to perform copolymerization with other copolymeizable monomers (e.g. vinyl acetate, diolefin).

POLYMERIZATION

The catalyst system of the present invention can be applied for conventional slurry polymerization as a matter of course, but it is also applicable to liquid phase solvent-free polymerization where substantially no solvent is used, solution polymerization or the gas phase polymerization method. Also, it is applicable for continuous polymerization, batch polymerization or a system in which preliminary polymerization is conducted. As the polymerization solvent in the case of slurry polymerization, saturated aliphatic or aromatic hydrocarbons, alone or their mixtures, such as hexane, heptane, pentane, cyclohexane, benzene, and toluene may be employed. The polymerization temperature may be from room temperature to about 200° C., preferably 50° to 150° C., and hydrogen can be auxiliarily employed as the molecular weight controller.

EXPERIMENTAL EXAMPLES

Example 1

(Synthesis of catalyst component)

Into a flask thoroughly purged with nitrogen were introduced 200 milliliters of dehydrated and deoxygenated n-heptane, then 0.1 mol of $MgCl_2$ and 0.2 mol of $Ti(O-nC_4H_9)_4$, and reaction was carried out at 95° C. for 2 hours. After completion of the reaction, the temperature was lowered to 40° C., and then 12 milliliters of methylhydropolysiloxane (20 centistokes) was introduced, and reaction was carried out for 3 hours. The solid component formed was washed with n-heptane to provide the component (A).

Next, into a flask thoroughly purged with nitrogen was introduced 50 milliliters of n-heptane purified in the same manner as mentioned above, and the component (A) as prepared above was introduced in an amount of 0.03 mol as calculated on Mg atoms. Then, a mixture of 25 milliliters of n-heptane with 0.05 mol of the component (D) $SiCl_4$ was introduced into the flask at 30° C. over 30 minutes, and the reaction was carried out at 90° C. for 3 hours.

Next, a mixture of 25 milliliters of n-heptane with 0.001 mol of ethyl borate (component (C)) and 0.003 and of phthalic acid chloride (component (B)) were introduced into the flask at 90° C. over 0.5 hours, and contacted at 95° C. for 1 hour. After completion of the contact, the product was washed with n-heptane. Subsequently, 0.03 mols of $SiCl_4$ was introduced and contact was effected at 100° C. for 6 hours. After completion of the contact, the product was washed with n-heptane to provide a catalyst component of the present invention. The titanium content in the catalyst component was found to be 2.1 wt.%.

(Polymerization of propylene)

Into an autoclave made of stainless steel of an inner volume of 1.5 liter equipped with stirring and temperature control means were introduced 500 milliliters of sufficiently dehydrated and deoxygenated n-heptane, 125 milligrams of triethylaluminum, 26.8 milligrams of diphenyldimethoxysilane and 15 milligrams of the catalyst component as synthesized above. Subsequently, 60 milliliters of hydrogen was introduced. The temperature and the pressure were raised, and polymerization was conducted under the conditions of a polymerization pressure=5 kg/cmG, a polymerization temperature=75° C. and a polymerization time=2 hours. After completion of the polymerization, the polymer slurry obtained was separated by filtration, and the polymer was dried. As the result, 226 grams of a polymer was obtained. The total product I.I (hereinafter abbreviated as T-I.I) was found to be 98.9 wt.% by the boiling heptane extraction test. MFR was found to be 3.6 g/10 min., and the polymer bulk density was 0.474 g/cc.

Example 2

(Synthesis of catalyst component)

A ball mill of 0.4-liter capacity thoroughly dried and purged with nitrogen was filled with 40 balls made of stainless steel of 12-mm diameter, and 20 grams of $MgCl_2$ and 4.1 grams of $Ti(OC_2H_5)_2Cl_2$ were respectively introduced and pulverized by the rotary ball mill for 48 hours. After completion of pulverization, the ground mixture was taken out and placed into a dry box to provide the component (A).

Next, 50 milliliters of thoroughly purified n-heptane was introduced, and the component (A) was introduced in an amount of 0.03 mol as calculated on Mg atoms. Subsequently, 0.002 mol of $Si(OCH_2H_5)_4$ (component (C)) was introduced at 30° C., and reaction was carried out at 70° C. for 1 hour. After the reaction, the product was washed with n-heptane. Next, 0.004 mol of phthalic acid chloride was introduced at 70° C., and reaction was carried out 80° C. for 1 hour. After the reaction, the product was washed with n-heptane. Then, 0.05 mol of $SiCl_4$ was introduced at 30° C., and reaction was carried out at 80° C. for 6 hours. After the reaction, the product was washed with n-heptane to provide a catalyst component.

The titanium content in the catalyst component was found to be 1.8 wt.%.

Polymerization of propylene was conducted under the polymerization conditions in Example 1 except for changing the amount used of diphenyldimethoxysilane to 53.6 milligrams. As a result, 70 grams of a polymer was obtained, with T-I.I=95.7 wt.%, MFR=8.2 g/10 min., and polymer bulk density=0.38 g/cc.

Example 3

(Synthesis of catalyst component)

Into a flask thoroughly purged with nitrogen, 100 milliliters of dehydrated and deoxygenated n-heptane was introduced and 0.1 mol of $Mg(OCH_2H_5)_2$ and 0.1 mol of a polybutyl titanate (polymerization degree n=4) were introduced. Reaction was carried out at 90° C. for 2 hours. Next, 0.15 mol of $SiCl_4$ was introduced at 30° C. over 30 minutes, and reaction was carried out at 50° C. for 3 hours. After completion of the reaction, the product was washed with n-heptane to provide the component (A).

Subsequently, into a flask thoroughly purged with nitrogen, 50 milliliters of amply purified n-heptane was introduced and the component (A) was introduced in an amount of 0.03 mol calculated on Mg. Next, 0.06 mol of

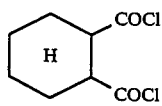

was introduced at 70° C. over 0.5 hours, and reaction was carried out at 70° C. for 1 hour. Next, 0.003 mol of $P(OC_2H_5)_3$ was introduced, and reaction was carried out at 70° C. After the reaction, the product was washed with n-heptane. Next, 0.06 mol of $CH_3SiCl_3$ was introduced and reaction was carried out at 80° C. for 8 hours. After the reaction, the product was washed with n-heptane to provide a catalyst component. The titanium content in the catalyst component was found to be 2.04 wt.%.

(Polymerization of propylene)

Polymerization of propylene was conducted under the polymerization conditions in Example 1, except for using 52 milligrams of phenyltriethoxysilane in place of diphenyldimethoxysilane. As a result, 77 grams of a polymer was obtained with T-I.I=96.5 wt.%, MFR=7.4 g/10 min., polymer bulk density=0.38 g/cc.

Comparative Examples 1 and 2

Catalyst components were synthesized as in Example 1 or 2 except for using no component (C), and, further, polymerization of propylene was conducted as in Examples 1 and 2 except for using the above catalyst components, respectively. The results are shown in Table 1 together with Examples 1 and 2.

Examples 4 to 7

Catalyst components were synthesized under the catalyst preparation conditions in Example 1 except for using the compounds shown in Table 2 as the component (C), and also polymerization of propylene was conducted in the same manner except for using the respective catalyst components obtained. The results are shown in Table 2.

Examples 8, 9, and 10

Catalyst components were synthesized under the catalyst preparation conditions in Example 2 except for the use of the compounds shown in Table 3 as the component (B), and also polymerization of propylene was conducted in the same manner except for the use of the respective catalyst components obtained. The results are shown in Table 3.

Examples 11, 12, and 13

Polymerization of propylene was conducted as in Example 3, except for the use of the compound shown in Table 4 as the component (D) in the catalyst preparation conditions in Example 3. The results are shown in Table 4.

Example 14

(Synthesis of catalyst component)

Into a flask thoroughly replaced with nitrogen was introduced 200 milliliters of dehydrated and deoxygenated n-heptane, which step was followed by the introduction of 0.4 mol of $MgCl_2$ and 0.8 mols of Ti-$(O-nC_4H_9)_4$, and reaction was carried out at 95° C. for 2 hours. After completion of the reaction, the temperature was lowered to 40° C.; 60 milliliters of 1,3,5,7-tetramethylcyclotetrasiloxane were introduced, and the reaction was carried out for 3 hours. The solid component formed was washed with n-heptane.

Next, into a flask thoroughly purged with nitrogen, 50 milliliters of n-heptane purified similarly as in Example 1 was introduced, and the solid component as synthesized above was introduced in an amount of 0.24 mols as calculated on Mg atoms. Subsequently, a mixture of 25 milliliters of n-heptane with 0.4 mols of $SiCl_4$ was introduced at 30° C. over 30 minutes, and reaction was carried out at 70° C. for 3 hours. After completion of the reaction, the product was washed with n-heptane.

Next, a mixture of 50 milliliters of n-heptane with 0.01 mol of $B(OCH_3)_3$ and 0.012 mol of phthalic acid chloride was introduced into a flask at 70° C. over 30 minutes, and reaction was carried out at 90° C. for 1 hour.

After completion of the reaction, the product was washed with n-heptane. Next, 20 milliliters of $SiCl_4$ was introduced, and reaction was carried out at 80° C. for 6 hours. After the reaction, the product was washed thoroughly with n-heptane. The titanium content in this product was found to be 1.98 wt.%.

Next, into a stirring tank made of stainless steel of an inner volume of 1.5 liters equipped with stirring and temperature control means, 500 milliliters of thoroughly dehydrated and deoxygenated n-heptane, 2.2 grams of triethylaluminum and 20 grams of the solid component as obtained were introduced. With the temperature within the stirring tank controlled at 20° C., propylene was introduced at a constant rate, and polymerization of propylene was conducted for 30 minutes. After this polymerization, the product was thoroughly washed with n-heptane. A part of the product was taken out for examination of the amount of propylene polymerized, which was found to be 1.07 grams of propylene per 1 gram of the solid component.

Into a flash thoroughly purged with nitrogen was introduced 50 milliliters of amply purified n-heptane, and then 5 grams of the component which had undergone the preliminary polymerization as obtained above was introduced. 0.16 milliliters of

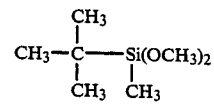

was then introduced as the silicon compound, and contact was effected at 30° C. for 2 hours. After completion of the contact, the product was thoroughly washed with n-heptane.

Next, 0.6 gram of triethylaluminum was introduced, and contact was effected at 30° C. for 2 hours. After completion of the contact, the product was amply washed with n-heptane. Then, 0.16 milliliter of

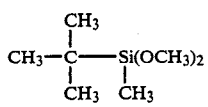

was introduced as the silicon compound component (E), and contact was effected at 30° C. for 2 hours. After completion of the contact, the product was amply washed with n-heptane to obtain a catalyst component.

(Polymerization of propylene)

Into an autoclave made of stainless steel of an inner volume of 1.5 liters equipped with stirring and temperature control means were introduced 500 milliliters of thoroughly dehydrated and deoxygenated n-heptane, 125 milligrams of triethylaluminum and the catalyst component as prepared above in a quantity of 15 milligrams calculated as the component from which the preliminarily polymerized polymer had been removed.

Next, 60 milliliters of hydrogen were introduced; the temperature and the pressure were raised; and polymerization was conducted at a polymerization pressure=5 kg/cmG, a polymerization temperature=75° C. and a polymerization time=2 hours. After completion of this polymerization, the polymer slurry obtained was separated by filtration, and the polymer was dried. As a result, 211.4 grams of a polymer were obtained. On the other hand, 0.59 gram of a polymer was obtained from the filtrate, and the T-I.I was found to be 99.2 wt.% according to the boiling heptane extraction test, with MFR=1.6 g/10 min. and polymer bulk density=0.48 g/cc.

TABLE 1

|  | Component (C) | Polymer yield (g) | T-I.I (wt. %) | MFR (g/10 min.) | Polymer bulk density (g/cc) |
|---|---|---|---|---|---|
| Example 1 | B(OC$_2$H$_5$)$_3$ | 226.6 | 98.9 | 3.6 | 0.474 |
| Comparative Example 1 | — | 183.4 | 98.2 | 3.9 | 0.467 |
| Example 2 | Si(OC$_2$H$_5$)$_4$ | 79 | 95.7 | 8.2 | 0.38 |
| Comparative Example 2 | — | 58 | 94.6 | 10.3 | 0.35 |

TABLE 2

| Example No. | Component (C) (amount used) | Polymer yield (g) | T-I.I (wt. %) | MFR (g/10 min.) | Polymer bulk density (g/cc) |
|---|---|---|---|---|---|
| 4 | CH$_3$OH (0.001 mol) | 231.4 | 98.9 | 3.2 | 0.472 |
| 5 | C$_2$H$_5$OH (0.001 mol) | 211.5 | 98.8 | 3.3 | 0.471 |
| 6 | Al(OC$_2$H$_5$)$_3$ (0.0015 mol) | 201.6 | 98.5 | 3.6 | 0.469 |
| 7 | CH$_3$COOC$_2$H$_5$ (0.0005 mol) | 191.0 | 98.4 | 3.9 | 0.468 |

TABLE 3

| Example No. | Component (B) (amount used) | Polymer yield (g) | T-I.I (wt. %) | MFR (g/10 min.) | Polymer bulk density (g/cc) |
|---|---|---|---|---|---|
| 8 | HC(COCl)=CH(COCl) (0.004 mol) | 61 | 94.8 | 9.6 | 0.34 |
| 9 | C$_6$H$_5$COCl (0.0045 mol) | 63 | 92.9 | 10.7 | 0.32 |
| 10 | CH$_3$(CH$_2$)$_2$COCl (0.004 mol) | 66 | 91.8 | 13.9 | 0.31 |

TABLE 4

| Example No. | Component (D) (amount used) | Polymer yield (g) | T-I.I (wt. %) | MFR (g/10 min.) | Polymer bulk density (g/cc) |
|---|---|---|---|---|---|
| 11 | CH$_3$(CH$_2$)$_6$SiCl$_3$ (0.06 mol) | 71.4 | 96.2 | 7.1 | 0.37 |
| 12 | SiBr$_4$ (0.07 mol) | 70.6 | 95.9 | 8.0 | 0.37 |

TABLE 4-continued

| Example No. | Component (D) (amount used) | Polymer yield (g) | T-I.I (wt. %) | MFR (g/10 min.) | Polymer bulk density (g/cc) |
|---|---|---|---|---|---|
| 13 | (C$_2$H$_5$)$_2$SiCl$_2$ (0.1 mol) | 58.5 | 95.7 | 8.7 | 0.40 |

Examples 15 to 19

Preparation of the catalyst component as in Example 14 was conducted except for changing the kinds and the amounts used of the silicon compound of the component (E), the kinds and the amounts used of the organoaluminum compound as shown in Table 5. Also, polymerization of propylene was carried out in the same manner. The results are shown in Table 5.

Example 20

(Preparation of catalyst component)

Preparation of the catalyst component as in Example 2 was conducted to the step of the reaction of the SiCl$_4$ of the component (D). Next, 5 grams of the solid component formed was introduced into a flask. Next, 0.74 milliliters of (CH$_3$)$_3$CSi(CH$_3$)(OCH$_3$)$_2$ was introduced, and contact was effected at 50° C. for 1 hour. After completion of the contact, the product was thoroughly washed with n-heptane to provide a catalyst component.

(Polymerization of propylene)

Polymerization was conducted as in Example 14, except for changing the amount used of triethylaluminum to 75 milligrams and the polymerization temperature to 70° C. 77.5 grams of a polymer was obtained, with T-I.I=93.6 wt.%, MFR=9.3 g/10 min. and a polymer bulk density=0.39 g/cc.

Example 21

(Preparation of catalyst component)

Preparation of the catalyst component as in Example 1 was conducted to the step of the reaction of the phthalic acid chloride of the component (B) and triethyl borate of the component (C). Next, a mixture of 0.02 mols of SiCl$_4$ of the component (D) and 3.6 milliliters of (CH$_3$)$_3$CSi(CH$_3$)(OCH$_3$)$_2$ was introduced at 30° C., and contact was effected at 40° C. for 3 hours. After completion of the contact, the product was thoroughly washed with n-heptane to provide a catalyst component.

(Polymerization of propylene)

Polymerization was conducted as in Example 20. 161.4 grams of a polymer were obtained, with T-I.I=96.9 wt.%, MFR=6.7 g/10 min., polymer bulk density=0.46 g/cc.

TABLE 5

| Example No. | Component (E) silicon compound (amount used) | Organoaluminum compound (amount used) | Polymer yield (g) | MFR (g/10 min.) | Polymer bulk density (g/cc) | T-I.I (wt. %) |
|---|---|---|---|---|---|---|
| 15 | (CH$_3$)$_3$CSi(OCH$_3$)$_3$ (0.21 ml) | diethylaluminum chloride (0.63 g) | 199.4 | 1.9 | 0.47 | 98.6 |
| 16 | (CH$_3$)$_3$CSi(OC$_2$H$_5$)$_3$ (0.29 ml) | tri-n-octylaluminum (0.95 g) | 184.5 | 2.9 | 0.47 | 97.9 |
| 17 | (CH$_3$)$_3$CSi(CH$_3$)$_2$(OCH$_3$) (0.36 ml) | — | 173.3 | 3.2 | 0.46 | 96.9 |
| 18 | 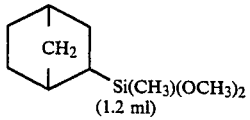 (1.2 ml) | triethylaluminum (0.3 g) | 184.5 | 2.1 | 0.47 | 98.8 |
| 19 | 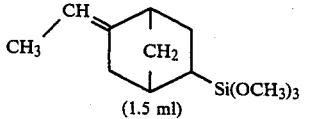 (1.5 ml) | triethylaluminum (0.5 g) | 197.6 | 3.0 | 0.48 | 97.3 |

Examples 22 and 23

By the use of the catalyst components prepared in Example 1 and Example 14, polymerization of propylene was conducted for 6 hours. The results are shown in Table 6. A polymerization of propylene was conducted under the same conditions except for changing the amount used of the catalyst component to 10 milligrams.

TABLE 6

| Example No. | Polymer yield (g) | T-I.I (wt. %) | MFR (g/10 min.) | Polymer bulk density (g/cc) | Polymerization activity ratio (6 hrs' polymerization/ 2 hrs' polymerization) |
|---|---|---|---|---|---|
| 22 | 247.9 | 98.0 | 4.1 | 0.48 | 1.64 |
| 23 | 279.4 | 98.6 | 1.5 | 0.49 | 1.98 |

What is claimed is:

1. A catalyst component for olefin polymerization, comprising a contact product of the following components (A), (B), (C), (D) and (E), wherein COMPONENT (A) is a solid catalyst component containing titanium, magnesium and a halogen as essential components, prepared by (i) contacting an alkoxymagnesium halide compound with a titanium compound containing an OR' group, wherein R' is a $C_{1-10}$ hydrocarbyl group, (ii) contacting a magnesium halide with a titanium tetraalkoxide and a polymeric silicon compound of the formula:

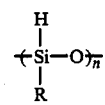

wherein R is a $C_{1-10}$ hydrocarbyl group and n is the degree of polymerization such that the viscosity of the polymer ranges from 1 to 100 centistokes, or (iii) reacting an organomagnesium compound with a halogenating agent, a reducing agent or combination thereof, and then the product obtained is contacted with a titanium compound containing an $OR^1$ group, wherein R' is as defined above;

COMPONENT (B) is an acyl halide compound;

COMPONENT (C) is a compound having an $OR^2$ group wherein $R^2$ represents a hydrocarbyl group or hydrogen atom, said compound being selected from the group consisting of alcohols, esters, ethers, a boron tri(lower)alkoxide, a silicon tetra(lower)alkoxide, a phosphorus tri(lower)alkoxide, vanadyl tri(lower)alkoxide, phosphoryl tri(lower)alkoxide and phosphoryl di(lower)alkoxide halide;

COMPONENT (D) is a silicon halide compound; and

COMPONENT (E) is a silicon compound of the formula: $R^{10}R^{11}_{3-n}Si(OR^{12})_n$, wherein $R^{10}$ is a $C_{3-20}$ branched hydrocarbyl group where the branching of the group is at the carbon atom adjacent the silicon atom, $R^{11}$ is the same or different from $R^{10}$ and is a $C_{1-20}$ hydrocarbyl group, $R^{12}$ is an aliphatic $C_{1-4}$ hydrocarbyl group and n is defined as $1 \leq n \leq 3$.

2. The catalyst component for olefin polymerization according to claim 1, wherein the titanium compound having at least one $OR^1$ group in the component (A) is a compound represented by $Ti(OR^1)_{4-n}X_n$ where $R^1$ is a hydrocarbyl group having 1 to 10 carbon atoms, X is a halogen and n represents a number defined by $0 \leq n \leq 3$.

3. The catalyst component for olefin polymerization according to claim 2, wherein $R^1$ is an alkyl group having 2 to 4 carbon atoms and X is Cl.

4. The catalyst component for olefin polymerization according to claim 1, wherein the titanium compound having at least one $OR^1$ group in the component (A) is a compound represented by a formula:

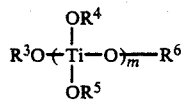

where $R^3$ to $R^6$, which may be the same or different, represent hydrocarbyl groups having 1 to 10 carbon atoms, and m represents a number in the range of 2 to 10.

5. The catalyst component for olefin polymerization according to claim 4, wherein $R^4$ and $R^5$ are both isopropyl groups or n-butyl groups, and m is 2 to 10.

6. The catalyst component for olefin polymerization according to claim 1, wherein the halogen in the component (A) is introduced as the titanium having at least one $OR^1$ group and/or the magnesium compound.

7. The catalyst component for olefin polymerization according to claim 6, wherein the halogen in the component (A) is introduced as $Ti(OR^1)_{4-n}X_n$ where $R^1$ is a hydrocarbon residue having 1 to 10 carbon atoms, X is a halogen and n is a number defined by $0 \leq n \leq 3$ and/or magnesium halide.

8. The catalyst component for olefin polymerization according to claims 1, wherein the halogen in the component is introduced as a metal halide or a metalloid halide selected from the group consisting of $AlCl_3$, $AlBr_3$, $Al(C_2H_5)Cl_2$, $SiCl_4$, $(CH_3)SiCl_3$, $HSiCl_3$, $FeCl_3$, $PCl_5$, $PCl_3$, and $BCl_3$.

9. The catalyst component for olefin polymerization according to claim 1, wherein the proportions of the respective components constituting the component (A) are as follows:

Ti component containing $OR^1$ group/Mg component in a molar ratio: $1 \times 10^{-3} \sim 100$; and halogen component/Mg component in a molar ratio: 0.1 to 1,000.

10. The catalyst component for olefin polymerization according to claim 9, wherein said proportions are as follows:

Ti component containing $OR^1$ group/Mg component in a molar ratio: 0.1 to 10;

halogen component/Mg component in a molar ratio: 1 to 100.

11. The catalyst component for olefin polymerization according to claim 1, wherein the acyl halide compound of the component (B) is represented by $R^7(COX)_n$ where $R^7$ represents a hydrocarbyl group having 1 to 20 carbon atoms, X represents a halogen and n is a number defined by $1 \leq n \leq 3$.

12. The catalyst component for olefin polymerization according to claim 10, wherein the acyl halide compound is selected from the group consisting of benzoic acid chloride, orthophthalic acid dichloride and hexahydroorthophthalic acid dichloride.

13. The catalyst component for olefin polymerization according to claim 1, wherein the component (C) is a compound having an $OR^2$ group where $R^2$ is a hydrocarbyl group having 1 to 10 carbon atoms or hydrogen atom.

14. The catalyst component for olefin polymerization according to claim 13, wherein the component (C) is a monohydric alcohol where $R^2$ in $OR^2$ is hydrogen atom and contains 1 to 18 carbon atoms.

15. The catalyst component for olefin polymerization according to claim 14, wherein the monohydric alcohol is a lower alkanol.

16. The catalyst component for olefin ploymerization according to claim 15, wherein the component (C) is a monohydric phenol wherein $R^2$ in $OR^2$ is hydrogen atom and contains 6 to 25 carbon atoms.

17. The catalyst component for olefin polymerization according to claim 13, wherein the component (C) is an ester wherein $R^2$ in $OR^2$ is a hydrocarbyl group having 1 to 10 carbon atoms and contains a total of 3 to 20 carbon atoms.

18. The catalyst component for olefin polymerization according to claim 17, wherein the ester is a lower alkyl ester of acetic acid.

19. The catalyst component for olefin polymerization according to claim 13, wherein the component (C) is an ether wherein $R^2$ in $OR^2$ is a hydrocarbyl group having 1 to 10 carbon atoms and contains at total of 2 to 20 carbon atoms.

20. The catalyst component for olefin polymerization according to claim 19, wherein the ether is selected from the group consisting of dimethyl ether, diethyl ether, methylethyl ether, diisopropyl ether, dibutyl ether, diamyl ether, tetrahydrofuran, diphenyl ether and methylphenyl ether.

21. The catalyst component for olefin polymerization according to claim 1, wherein the component (D) is represented by $R^9{}_p SiX_{4-q}$ where $R^9$ is hydrogen atom or a hydrocarbyl group having 1 to 20 carbon atoms or a halohydrocarbyl group, X is halogen, p and q are respectively defined by $0 \leq p < 4$ and $0 < q \leq 4$.

22. The catalyst component for olefin polymerization according to claim 21, wherein p is 0.

23. The catalyst component for olefin polymerization according to claim 21, wherein p is greater than 0 and $R^9$ is a lower alkyl.

24. The catalyst component for olefin polymerization according to claim 1, wherein the proportions of the components (A) ∼ (D) are as follows:
component (B)/magnesium in component (A) in a molar ratio: $1 \times 10^{-3} \sim 10$;
component (C)/magnesium in component (A) in a molar ratio: $1 \times 10^{-3} \sim 10$;
component (D)/magnesium in component (A) in a molar ratio: $1 \times 10^{-3} \sim 100$.

25. The catalyst component for olefin polymerization according to claim 24, wherein the proportions of the components (A) ∼ (D) are as follows:
component (B)/magnesium in component (A) in a molar ratio: $1 \times 10^{-2} \sim 1$;
component (C)/magnesium in component (A) in a molar ratio: $1 \times 10^{-2} \sim 1$;
component (D)/magnesium in component (A) in a molar ratio: $0.1 \sim 10$.

26. The solid catalyst component for olefin polymerization according to claim 1, wherein the solid catalyst component is one which has undergone preliminary polymerization of an olefin in the presence of an organometal compound of the groups I to I(I of the Periodic Table.

27. The solid catalyst component for olefin polymerization according to claim 26, wherein the organometal compound is an organoaluminum compound.

28. The solid catalyst component for olefin polymerization according to claim 27, wherein the olefin is a $C_2$-$C_6$ olefin.

29. A catalyst for olefin polymerization, comprising a combination of a catalyst component for olefin polymerization according to claim 1 and an organoaluminum compound.

30. The catalyst for polymerization of olefin according to claim 29, wherein the organoaluminum compound is represented by $R^{13}{}_{3-n}AlX_n$ or $R^{14}{}_{3-m}Al(OR^{15})_m$ where $R^{13}$ and $R^{14}$ are each a hydrocarbyl group having 1 to 20 carbon atoms or hydrogen atom, $R^{15}$ is a hydrocarbyl group having 1 to 20 carbon atoms, X is a halogen, n and m are respectively numbers defined by $0 \leq n < 2$, $0 \leq m \leq 1$.

31. The catalyst for polymerization of an olefin according to claim 29, wherein the organoaluminum compound comprises a combination of an organoaluminum compound of the formula: $R^{13}{}_{3-n}AlX_n$ or $R^{14}{}_{3-m}Al(OR^{15})_m$, where $R^{13}$ and $R^{14}$ are each a hydrocarbyl group having from 1 to 20 carbon atoms or each is a hydrogen, $R^{15}$ is a hydrocarbyl group having from 1 to 20 carbon atoms, X is halogen and n and m respectively are numbers defined by the expressions: $0 \leq n \leq 2$ and $0 \leq m \leq 1$.

* * * * *